(12) United States Patent
Kobayashi et al.

(10) Patent No.: US 7,981,966 B2
(45) Date of Patent: Jul. 19, 2011

(54) RUBBER COMPOSITION

(75) Inventors: Naokazu Kobayashi, Mie (JP); Kouta Taniguchi, Mie (JP); Toshihiro Tadaki, Mie (JP)

(73) Assignee: JSR Corporation, Tokyo (JP)

( * ) Notice: Subject to any disclaimer, the term of this patent is extended or adjusted under 35 U.S.C. 154(b) by 591 days.

(21) Appl. No.: 10/591,279

(22) PCT Filed: Mar. 2, 2005

(86) PCT No.: PCT/JP2005/003452
§ 371 (c)(1),
(2), (4) Date: Aug. 31, 2006

(87) PCT Pub. No.: WO2005/085343
PCT Pub. Date: Sep. 15, 2005

(65) Prior Publication Data
US 2007/0185267 A1   Aug. 9, 2007

(30) Foreign Application Priority Data
Mar. 3, 2004 (JP) ................................ 2004-058614

(51) Int. Cl.
*C08L 9/00* (2006.01)
*C08L 19/00* (2006.01)
*C08L 9/06* (2006.01)
*C08K 3/00* (2006.01)
*C08K 3/04* (2006.01)

(52) U.S. Cl. ........ 525/237; 525/100; 525/102; 525/105; 525/191; 525/236; 525/342; 152/905

(58) Field of Classification Search .................. 525/191, 525/209, 241, 102, 105, 342, 50, 236, 237; 526/178, 180, 335, 338, 340, 278; 152/905
See application file for complete search history.

(56) References Cited

U.S. PATENT DOCUMENTS

| 4,914,248 | A | 4/1990 | Kitagawa et al. |
| 5,115,006 | A | 5/1992 | Watanabe et al. |
| 5,652,310 | A | 7/1997 | Hsu et al. |
| 5,902,856 | A | 5/1999 | Suzuki et al. |
| 2004/0254301 | A1 | 12/2004 | Tsukimawashi et al. |

FOREIGN PATENT DOCUMENTS

| EP | 1 205 506 A2 | 5/2002 |
| EP | 1 457 501 A1 | 9/2004 |
| JP | 7-233216 | 9/1995 |
| JP | 9 208633 | 8/1997 |
| JP | 2001-114936 | 4/2001 |
| JP | 2001 114936 | 4/2001 |
| JP | 2001 131229 | 5/2001 |
| JP | 2001-131229 | 5/2001 |
| JP | 2001-158837 | 6/2001 |
| JP | 2003-171418 | 6/2003 |
| JP | 2003 253056 | 9/2003 |
| WO | WO-03029299 A1 * | 9/2002 |

OTHER PUBLICATIONS

Machine Translation of JP 2001114936.*
U.S. Appl. No. 10/567,905, filed Feb. 10, 2006, Taniguchi, et al.

* cited by examiner

*Primary Examiner* — Irina S. Zemel
*Assistant Examiner* — Jeffrey Lenihan
(74) *Attorney, Agent, or Firm* — Oblon, Spivak, McClelland, Maier & Neustadt, L.L.P.

(57) ABSTRACT

There is obtained a rubber composition excellent in processability of unvulcanized compounded rubber, excellent in wear resistance and wet skid resistance of vulcanized rubber, low in rolling resistance, and suitable for tire applications, particularly for tire tread applications in which importance is given to low fuel consumption and safety.

A rubber composition mainly comprising (I) 0.5 to 35% by weight of a conjugated diene-based (co)polymer rubber having an amino group and an alkoxysilyl group on a polymer chain and having a weight average molecular weight of 1,000 to 90,000, and (II) 99.5 to 65% by weight of a conjugated diene-based (co)polymer rubber having a weight average molecular weight of 100,000 to 2,000,000 (with the proviso that (I)+(II)=100% by weight).

4 Claims, No Drawings

RUBBER COMPOSITION

TECHNICAL FIELD

The present invention relates to a rubber mainly comprising a conjugated diene-based (co)polymer rubber which can be made into vulcanized rubber which is low in rolling resistance and excellent in wet skid properties, and has sufficient wear resistance, tensile strength and the like, when an inorganic filler such as silica is blended as a reinforcing material, and to an oil-extended rubber containing this rubber and an extender oil. Further, the invention relates to a rubber composition containing the conjugated diene-based rubber or the oil-extended rubber and the inorganic filler, and having excellent processability. The vulcanized rubber comprising this rubber composition is useful particularly as tire treads.

BACKGROUND ART

With a recent demand for low fuel consumption to automobiles, there have been required raw rubber materials such as conjugated diene-based (co)polymer rubbers from which rubber compositions for tires having low rolling resistance, excellent in wear resistance and failure characteristics, and high in wet skid resistance which is a representative index of driving stability can be prepared.

What is necessary to reduce the rolling resistance of tires is just to lower the hysteresis loss of vulcanized rubbers. The hysteresis loss can be evaluated using various properties as indexes. For example, raw rubber materials having high impact resilience at 50 to 80° C., a low tan δ at 50 to 80° C. or low Goodrich heat build-up are preferred. The raw rubber materials with low hysteresis loss include natural rubber, isoprene rubber, butadiene rubber and the like. However, these have the problem of low wet skid resistance.

On the other hand, in recent years, there have been proposed methods of using an inorganic filler such as silica as a reinforcing agent, or an inorganic filler and carbon black in combination. Tire treads using the inorganic filler or both the inorganic filler and carbon black are low in rolling resistance and excellent in driving stability represented by wet skid resistance. However, they have the problem of poor wearing resistance, tensile strength and the like of vulcanized rubbers. Part of the reason for this has been considered to be the fact that the affinity of inorganic filler for the conjugated diene-based rubber is lower than that of carbon black, so that a sufficient reinforcing effect can not be obtained.

In view of the above-mentioned problems, the present inventors have proposed a rubber-inorganic compound composite material containing (I) a conjugated diolefin (co)polymer rubber having a primary amino group and an alkoxysilyl group bonded to a polymer chain and (II) an inorganic compound (JP-A-2004-067982). Then, the conjugated diolefin (co)polymer rubber (I) used herein has the primary amino group and the alkoxysilyl group on the polymer chain, and the weight average molecular weight of the rubber is usually form 100,000 to 2,000,000. Accordingly, the alkoxysilyl group of the above-mentioned conjugated diolefin (co)polymer rubber reacts with silica which acts as a filler, and the amino group reacts with carbon black which acts as a filler, resulting in the formation of the rubber-inorganic compound composite material having affinity for these fillers. A rubber composition using this composite material is useful as tires or vibration insulators. However, the conjugated diolefin (co) polymer rubber (I) of JP-A-2004-067982 has a weight average molecular weight as high as 100,000 to 2,000,000, similarly to normal rubber. Accordingly, when these fillers are blended, the alkoxysilyl group or amino group existing in the molecular chain reacts with silica or carbon black to increase the melt viscosity in kneading, which causes poor processability. As a result, an increase in product percent defective and a rise in production cost are liable to cause problems.

DISCLOSURE OF THE INVENTION

Problems That the Invention is to Solve

An object of the invention is to provide a conjugated diene-based (co)polymer rubber which is excellent in processability of unvulcanized compounded rubber, excellent in wear resistance and wet skid resistance of vulcanized rubber, low in rolling resistance, and therefore, suitable for tire applications, particularly for tire tread applications in which importance is given to low fuel consumption and safety.

Means for Solving the Problems

The present invention relates to a rubber composition mainly comprising (I) 0.5 to 35% by weight of a conjugated diene-based (co)polymer rubber (hereinafter also referred to as "(co)polymer rubber (I)") having an amino group and an alkoxysilyl group on a polymer chain and having a weight average molecular weight of 1,000 to 90,000, and (II) 99.5 to 65% by weight of a conjugated diene-based (co)polymer rubber (hereinafter also referred to as "(co)polymer rubber (II)") having a weight average molecular weight of 100,000 to 2,000,000 (with the proviso that (I)+(II)=100% by weight).

Component (I) as used herein is preferably one represented by the following formula (1) or (2):

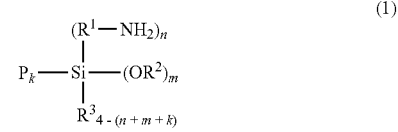

(1)

wherein P is a (co)polymer chain comprising a conjugated diene alone or a conjugated diene and an aromatic vinyl compound, $R^1$ is an alkylene group having 1 to 12 carbon atoms, $R^2$ and $R^3$ are each independently an alkyl group having 1 to 20 carbon atoms or an aryl group, n is an integer of 1 or 2, m is an integer of 1 or 2, and k is an integer of 1 or 2, with the proviso that n+m+k is an integer of 3 or 4,

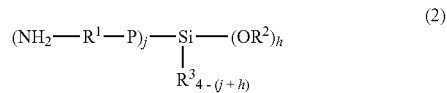

(2)

wherein P, $R^1$, $R^2$ and $R^3$ have the same definitions as given for the above-mentioned formula (1), j is an integer of 1 to 3, and h is an integer of 1 to 3, with the proviso that j+h is an integer of 2 to 4.

Further, component (II) is preferably one having at least one selected from the group consisting of an amino group, an alkoxysilyl group, an epoxy group, a hydroxyl group, a tin atom and silicon atom, on a polymer chain.

Furthermore, in the rubber composition of the invention, an extending oil may be further incorporated in an amount of 10 to 50 parts by weight based on 100 parts by weight of the total amount of the rubber components including the above-mentioned components (I) and (II).

In addition, the rubber composition of the invention may further contain silica and/or carbon black, and the content thereof is from 1 to 150 parts by weight based on 100 parts by weight of the total amount of the above-mentioned components (I) and (II).

Advantages of the Invention

The rubber composition of the invention is excellent in processability of unvulcanized compounded rubber, excellent in wear resistance and wet skid resistance of vulcanized rubber, low in rolling resistance, and therefore, suitable for tire applications, particularly for tire tread applications in which importance is given to low fuel consumption and safety.

BEST MODE FOR CARRYING OUT THE INVENTION

Conjugated Diene-Based (Co)polymer Rubber (I):

The conjugated diene-based (co) polymer rubber used in the rubber-inorganic compound composite material of the invention is characterized in that it is a (co)polymer rubber obtained by (co)polymerizing a conjugated diene alone or this and an aromatic vinyl compound, and has a primary amino group and an alkoxysilyl group.

Component (I) has the primary amino group and the alkoxysilyl group together, thereby having affinity for fillers such as silica and carbon black, which makes it possible to blend the fillers in large amounts and homogeneously.

The content of the primary amino group bonded to (co)polymer rubber (I) is preferably from 1 to 600 mmol/kg of (co)polymer rubber polymer. The content is more preferably from 5 to 500 mmol/kg of weight of (co)polymer rubber polymer, and particularly preferably from 10 to 500 mmol/kg of (co)polymer rubber polymer. The (co)polymer rubber polymer as used herein means the weight of only a polymer containing no additives such as an antiaging agent added during or after the production.

Although the primary amino group may be bonded to any one of a polymerization initiating terminal, a polymerization terminating terminal, a polymer main chain and a side chain, it is preferably introduced into the polymerization initiating terminal or the polymerization terminating terminal, in that energy disappearance from a polymer terminal is inhibited to be able to improve hysteresis loss characteristics.

When the amount of the primary amino groups bonded to the polymer chain exceeds 600 mmol/kg of (co)polymer rubber polymer, cost unfavorably rises. On the other hand, when the amount of the primary amino groups is less than 1 mmol/kg of (co)polymer rubber polymer, it becomes difficult to exhibit the effect of introduction of the primary amino group. That is to say, the hysteresis loss characteristics, wear resistance and failure characteristics of the resulting (co)polymer rubber are not sufficiently improved. It is therefore unfavorable.

Further, the content of the alkoxysilyl group bonded to the (co)polymer rubber is preferably from 1 to 600 mmol/kg of (co)polymer rubber polymer, more preferably from 5 to 500 mmol/kg of (co)polymer rubber polymer, and particularly preferably from 10 to 500 mmol/kg of (co)polymer rubber polymer.

Although the alkoxysilyl group may be bonded to any one of a polymerization initiating terminal, a polymerization terminating terminal, a polymer main chain and a side chain, it is preferably introduced into the polymerization initiating terminal or the polymerization terminating terminal, in that energy disappearance from a polymer terminal is inhibited to be able to improve hysteresis loss characteristics.

When the amount of the alkoxysilyl groups bonded to the polymer chain exceeds 600 mmol/kg of (co)polymer rubber polymer, cost unfavorably rises. On the other hand, when the amount of the alkoxysilyl groups is less than 1 mmol/kg of (co)polymer rubber polymer, it becomes difficult to exhibit the effect of introduction of the alkoxysilyl group. That is to say, the hysteresis loss characteristics, wear resistance and failure characteristics of the resulting (co)polymer rubber are not sufficiently improved. It is therefore unfavorable.

According to a first production process, the above-mentioned (co)polymer rubber (I) used in the invention can be produced by polymerizing either a conjugated diene alone or this and an aromatic vinyl compound in a hydrocarbon solvent by anionic polymerization using an organic alkali metal and/or an organic alkali earth metal as an initiator, adding a compound having a protected primary amino group and an alkoxysilyl group, at the time when the polymerization has substantially completed, to react it with a living polymer chain terminal, and then conducting deblocking (hydrolysis). According to this production process, (1) the primary amino group and the alkoxysilyl group can be easily introduced at the same time by a single-step reaction, and (2) it is possible to obtain a high introduction rate.

The compound having a protected primary amino group and an alkoxysilyl group includes, for example, a compound represented by the following formula (3) or (4):

[Formula 1]

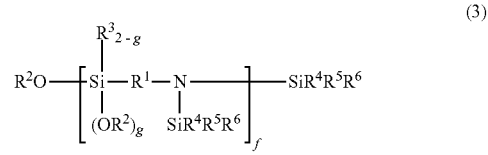

(3)

wherein $R^1$ is an alkylene group having 1 to 12 carbon atoms, $R^2$ and $R^3$ are each independently an alkyl group having 1 to 20 carbon atoms or an aryl group, $R^4$, $R^5$ and $R_6$ are each independently an alkyl group having 1 to 20 carbon atoms or aryl group, or two of them may combine with each other to form a ring together with silicon atoms to which they are bonded, g is an integer of 1 or 2, and f is an integer of 1 to 10,

[Formula 1]

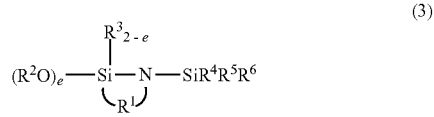

(3)

wherein $R^1$, $R^2$ and $R^3$ have the same definitions as given for the above-mentioned formula (3), $R^4$, $R^5$ and $R^6$ also have the same definitions as given for the above-mentioned formula (3), and e is an integer of 1 or 2.

In the above-mentioned formula (3), the alkylene groups having 1 to 12 carbon atoms of $R^1$ include, for example, a methylene group, an ethylene group and a propylene group.

The alkyl groups having 1 to 20 carbon atoms include, for example, a methyl group, an ethyl group and a propyl group.

The aryl groups include, for example, a phenyl group, toluyl group and a naphthyl group.

Further, the ring formed by combining two of $R^4$, $R^5$ and $R^6$ together with silicon atoms to which they are bonded may be a 4- to 7-membered ring.

Furthermore, the protective groups for the amino group include, for example, an alkylsilyl group.

The alkylsilyl groups include, for example, a trimethylsilyl group, a triethylsilyl group, a triphenylsilyl group, a methyldiphenylsilyl group and an ethylmethyl-phenylsilyl group.

The compounds having a protected amino group and an alkoxysilyl group include, for example, N,N-bis(trimethylsilyl)aminopropylmethyldimethoxysilane, 1-trimethylsilyl-2,2-dimethoxy-1-aza-2-silacyclopentane, N,N-bis(trimethyl-silyl)aminopropyltrimethoxysilane, N,N-bis(trimethylsilyl)-amino-propyltriethoxysilane, N,N-bis(trimethylsilyl)amino-propylmethyldiethoxysilane, N,N-bis(trimethylsilyl)amino-ethyltrimethoxysilane, N,N-bis(trimethylsilyl)aminoethyl-triethoxysilane, N,N-bis(trimethylsilyl)aminoethylmethyl-dimethoxysilane, N,N-bis(trimethylsilyl)aminoethylmethyl-diethoxysilane and the like.

The reaction of the living polymer chain terminal, for example,

P⁻Li+ with N,N-bis(trimethylsilyl)aminopropylmethyldimethoxysilane which is the compound having a protected amino group and an alkoxysilyl group can be represented by the following reaction formula;

[Formula 3]

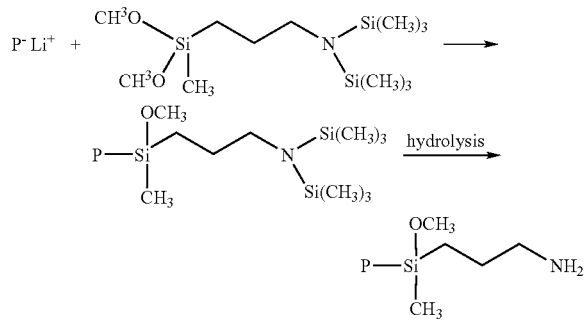

wherein P represents a (co) polymer chain of a conjugated diene or a conjugated diene and an aromatic vinyl compound.

Similarly, the reaction of the living polymer chain terminal with 1-trimethylsilyl-2,2-dimethoxy-1-aza-2-silacyclopentane which is the compound having a protected amino group and an alkoxysilyl group can be represented by the following formula:

[Formula 4]

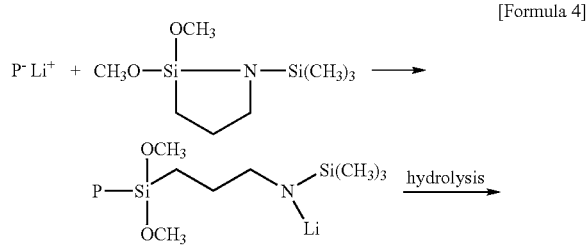

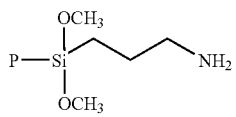

Further, 1-trimethylsilyl-2,2-dimethoxy-1-aza-2-silacyclopentane which is the above-mentioned compound having a protected amino group and an alkoxysilyl group can be allowed to react with two molecules of the living polymer chain terminals, and in that case, the reaction can be represented by the following reaction formula:

[Formula 5]

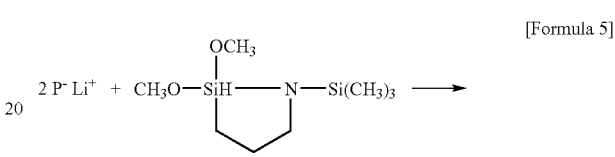

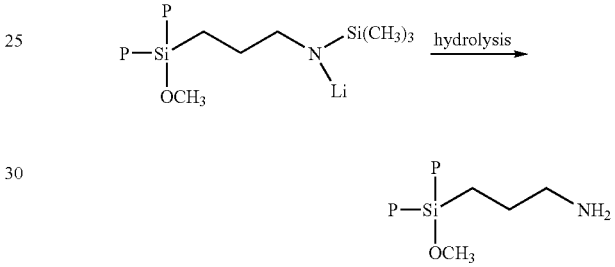

Further, according to a second production process, the (co)polymer rubber of the invention can be produced by polymerizing either a conjugated diene alone or a conjugated diene and an aromatic vinyl compound in a hydrocarbon solvent by anionic polymerization using a lithium amide initiator represented by the following formula (5) or (6), adding an alkoxysilane compound represented by the following formula (7) to react it with a living polymer chain terminal at the time when the polymerization has substantially completed, and then conducting deblocking (hydrolysis).

$(R^4R^5R^6Si)_2$—N—$R^1$—Li     (5)

wherein $R^1$, $R^4$, $R^5$ and $R^6$ have the same definitions as given for the above-mentioned formula (3),

[Formula 6]

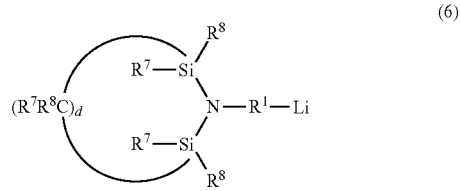

wherein $R^1$ has the same definition as given for the above-mentioned formula (3), $R^7$ and $R^8$ are each independently hydrogen, an alkyl group having 1 to 20 carbon atoms or an aryl group, and d is an integer of 1 to 7,

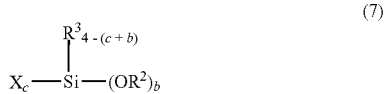

(7)

wherein $R^2$ and $R^3$ have the same definitions as given for the above-mentioned formula (3), X is a halogen atom, c is an integer of 0 to 2, and b is an integer of 1 to 4, with the proviso that c+d is an integer of 2 to 4.

As understandable from the above-mentioned reaction examples, the (co)polymer rubber of the invention is preferably one represented by the following formula (1) or (2):

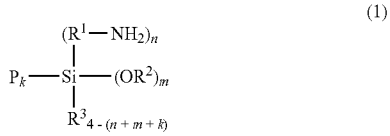

(1)

wherein P is a (co)polymer chain comprising a conjugated diene alone or a conjugated diene and an aromatic vinyl compound, $R^1$ is an alkylene group having 1 to 12 carbon atoms, $R^2$ and $R^3$ are each independently an alkyl group having 1 to 20 carbon atoms or an aryl group, n is an integer of 1 or 2, m is an integer of 1 or 2, and k is an integer of 1 or 2, with the proviso that n+m+k is an integer of 3 or 4,

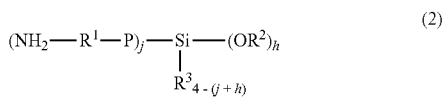

(2)

wherein P, $R^1$, $R^2$ and $R^3$ have the same definitions as given for the above-mentioned formula (1), j is an integer of 1 to 3, and h is an integer of 1 to 3, with the proviso that j+h is an integer of 2 to 4.

(Co)polymer rubber (I) used in the invention is a (co)polymer obtained by (co)polymerizing either a conjugated diene alone or a conjugated diene and an aromatic vinyl compound, with a copolymerizable third monomer depending on the circumstances, and is characterized in that it has a primary amino group and an alkoxysilyl group, as described above.

As the conjugated diene compound used in the invention, there is preferably used, for example, 1,3-butadiene, isoprene, 2,3-dimethyl-1,3-butadiene, 2-chloro-1,3-butadiene, 1,3-pentadiene, a mixture thereof or the like. The amount of the conjugated diene used is from 50 to 100% by weight, preferably from 50 to 99.999% by weight, and more preferably from 50 to 95% by weight, based on all monomers. Less than 50% by weight results in increased hysteresis loss.

The aromatic vinyl compounds include, for example, styrene, 2-methylstyrene, 3-methylstyrene, 4-methylstyrene, α-methylstyrene, 2,4-dimethylstyrene, 2,4-diisopropylstyrene, 4-tert-butylstyrene, divinylbenzene, tert-butoxystyrene, vinylbenzyldimethylamine, (4-vinylbenzyl) dimethyl aminoethyl ether, N,N-dimethylaminoethylstyrene, vinylpyridine, a mixture thereof and the like. Of these, styrene is particularly preferred. The amount of the aromatic vinyl compound used is preferably from 0.001 to 50% by weight, and more preferably from 5 to 50% by weight, based on all monomers.

Further, the copolymerizable third monomers include, for example, acrylonitrile, methyl methacrylate, ethyl methacrylate, methyl acrylate, ethyl acrylate, hydroxyethyl methacrylate and hydroxyethyl acrylate. The amount of the third monomer used is usually less than 25% by weight based on all monomers.

(Co)polymer rubber (I) of the invention includes the following (co)polymer rubber of (I-1) or (I-2) as a preferred embodiment.

(I-1); (1) The content of polymerization units of the aromatic vinyl compound is from 5% by weight to less than 50% by weight based on the (co)polymer rubber, the content of polymerization units of the conjugated diene is more than 50% by weight to 95% by weight based on the (co)polymer rubber, and the content of polymerization units of the copolymerizable third monomer is from 0% by weight to less than 25% by weight based on the (co)polymer rubber, and (2) the vinyl bond content is 30% or more, and preferably from 35% to less than 70%, based on polymerization units of the conjugated diene (this (co)polymer rubber is sometimes referred to as the first (co)polymer rubber).

(I-2); The content of polymerization units of the aromatic vinyl compound is from 5 to 50% by weight based on the (co)polymer rubber, the content of polymerization units of the conjugated diene is more than 30 to 70% by weight based on the (co)polymer rubber, and the content of polymerization units of the copolymerizable third monomer is from 0 to 20% by weight based on the (co)polymer rubber, and (2) the vinyl bond content is from 15 to 70% based on polymerization units of the conjugated diene (this (co)polymer rubber is sometimes referred to as the second (co)polymer rubber).

In the first (co)polymer rubber of the invention, the content of the bonded aromatic vinyl compound bonded to the polymer chain, that is to say, the content of polymerization units of the aromatic vinyl compound, is from 5% by weight to less than 50% by weight, and more preferably from 10% by weight to 47% by weight, based on the (co) polymer rubber, as described above. When the content of the bonded aromatic vinyl compound is less than 5% by weight, wet skid characteristics, wear resistance and fracture characteristics deteriorate. On the other hand, when the content is 50% by weight or more, a balance between hysteresis loss and wet skid characteristics deteriorate.

Further, the content of the conjugated diene bonded to the polymer chain, that is to say, the content of polymerization units of the conjugated diene is from more than 50% by weight to 95% by weight, and preferably from 53 to 90% by weight.

In the first (co)polymer rubber of the invention, the vinyl bond (1,2-bond and/or 3,4-bond) content is 30% or more, and preferably from 35% to less than 70%, based on polymerization units of the conjugated diene. When the vinyl bond content is less than 30%, a balance between hysteresis loss and wet skid characteristics deteriorates. Further, it is difficult to exceed 90% by a usual synthesis method of the copolymer rubber of the aromatic vinyl compound and the conjugated diene.

Further, in the second (co)polymer rubber of the invention, the content of the bonded aromatic vinyl compound bonded to the polymer chain is from 5 to 50% by weight, and preferably from 10 to 48% by weight, based on the (co)polymer rubber, as described above. When the content of the bonded aromatic vinyl compound is less than 5% by weight, wet skid characteristics, wear resistance and fracture characteristics deteriorate. On the other hand, exceeding 50% by weight results in increased hysteresis loss.

In the second (co)polymer rubber of the invention, the content of polymerization units of the conjugated diene is from 50 to 95% by weight, and preferably from 52 to 90% by weight.

Further, in the second (co)polymer rubber of the invention, the vinyl bond (1,2-bond and/or 3,4-bond) content in polymerization units of the conjugated diene is 30 to 70%, and preferably from 35 to 65%, based on polymerization units of the conjugated diene. When the vinyl bond content is less than 30%, wet skid characteristics deteriorate to cause poor driving stability. On the other hand, exceeding 65% results in deterioration of breaking strength and wear resistance, and increased hysteresis loss.

The first production process will be described below.

The polymerization reaction and the reaction with the compound having the primary amino group protected and the alkoxysilyl group for obtaining (co)polymer rubber (I) of the invention are usually conducted within the temperature range of 0 to 120° C., under either constant temperature conditions or elevated temperature conditions. The hydrolysis for deblocking the primary amino group protected is conducted by adding a 2-fold or more molar excess of water or acidic water in relation to the compound having the primary amino group protected and the alkoxysilyl group to conduct the reaction for 10 minutes or more, preferably for 30 minutes or more. The polymerization system may be either a batch polymerization system or a continuous polymerization system.

Examples of the initiators of the organic alkali metals and the organic alkali earth metals used in the polymerization include alkyllithiums such as n-butyllithium, sec-butyllithium and t-butyllithium, alkylenedilithiums such as 1,4-dilithiobutane, phenyllithium, stilbenelithium, lithiumnaphthalene, sodiumnaphthalene, potassiumnaphthalene, n-butylmagnesium, n-hexylmagnesium, ethoxycalcium, calcium stearate, t-butoxystrontium, ethoxybarium, isopropoxybarium, ethylmercaptobarium, t-butoxybarium, phenoxybarium, di-ethylaminobarium, barium stearate and the like.

Further, the organic alkali metal as the above-mentioned initiator can be used for the (co)polymerization of the conjugated diene or the conjugated diene and the aromatic vinyl compound, as a reaction product with a secondary amine compound or a tertiary amine compound. As the organic alkali metal allowed to react with the above-mentioned secondary amine compound or tertiary amine compound, an organic lithium compound is preferred. More preferably, n-butyllithium or sec-butyllithium is used.

Examples of the secondary amine compounds allowed to react with the organic alkali metal include dimethylamine, diethylamine, dipropylamine, di-n-butylamine, di-sec-butylamine, dipentylamine, dihexylamine, di-n-octylamine, di-(2-ethylhexyl)amine, dicyclohexylamine, N-methylbenzylamine, diallylamine, morpholine, piperazine, 2,6-dimethylmorpholine, 2,6-dimethylpiperazine, 1-ethylpiperazine, 2-methylpiperazine, 1-benzylpiperazine, piperidine, 3,3-dimethylpiperidine, 2,6-dimethylpiperidine, 1-methyl-4-(methylamino)piperidine, 2,2,6,6-tetramethylpiperidine, pyrrolidine, 2,5-dimethylpyrrolidine, azetidine, hexamethyleneimine, heptamethyleneimine, 5-benzyloxyindole, 3-azaspiro[5,5]-undecane, 3-azabicyclo[3.2.2]nonane, carbazole and the like.

Further, examples of the tertiary amine compounds allowed to react with the organic alkali metal include N,N-dimethyl-o-toluidine, N,N-dimethyl-p-toluidine, N,N-dimethyl-m-toluidine, α-picoline, β-picoline, γ-picoline, benzyldimethylamine, benzyldiethylamine, benzyldipropylamine, benzyldibutylamine, (o-methyl-benzyl)dimethylamine, (m-methylbenzyl)dimethylamine, (p-methylbenzyl)dimethylamine, N,N-tetramethylene-o-toluidine, N,N-heptamethylene-o-toluidine, N,N-hexamethylene-o-toluidine, N,N-trimethylene-benzylamine, N,N-tetramethylenebenzylamine, N,N-hexamethylenebenzylamine, N,N-tetramethylene(o-methylbenzyl)-amine, N,N-tetramethylene(p-methylbenzyl)amine, N,N-hexamethylene(o-methylbenzyl)amine, N,N-hexamethylene(p-methylbenzyl) amine and the like.

Furthermore, in the polymerization, an ether compound such as diethyl ether, di-n-butyl ether, ethylene glycol diethyl ether, ethylene glycol dibutyl ether, diethylene glycol dimethyl ether, propylene glycol dimethyl ether, propylene glycol diethyl ether, propylene glycol dibutyl ether, tetrahydrofuran, 2,2-(bistetrahydrofurfuryl)propane, bistetrahydrofurfuryl formal, methyl ether of tetrahydrofurfuryl alcohol, ethyl ether of tetrahydrofurfuryl alcohol, butyl ether of tetrahydrofurfuryl alcohol, α-methoxytetrahydrofuran, dimethoxybenzene or dimethoxyethane and/or a tertiary amine compound such as triethylamine, pyridine, N,N,N',N'-tetramethylethylenediamine, dipiperidinoethane, methyl ether of N,N-diethylethanolamine, ethyl ether of N,N-diethylethanolamine or butyl ether of N,N-diethylethanolamine can be added to the polymerization system to adjust a microstructure (vinyl bond content) of a conjugated diene moiety of the diene-based (co)polymer rubber, as needed.

The hydrocarbon solvents used in polymerizing (co)polymer rubber (I) of the invention include, for example, pentane, hexane, heptane, octane, methylcyclopentane, cyclohexane, benzene, toluene, xylene and the like. Of these, cyclohexane and heptane are preferred.

When the reactivity of the initiator used in the invention is intended to be improved, or when the aromatic vinyl compound introduced into the polymer rubber is intended to be randomly arranged or a single chain of the aromatic vinyl compound is intended to be given, a potassium compound may be added together with the initiator. As the potassium compound added together with the initiator, there are used, for example, a potassium alkoxide represented by potassium isopropoxide, potassium t-butoxide, potassium t-amyloxide, potassium n-heptaoxide, potassium benzyloxide or potassium phenoxide; a potassium salt of isovaleric acid, capric acid, lauric acid, palmitic acid, stearic acid, oleic acid, linolenic acid, benzoic acid, phthalic acid, 2-ethylhexanoic acid or the like; a potassium salt of an organic sulfonic acid such as dodecylbenzenesulfonic acid, tetradecylbenzenesulfonic acid, hexadecylbenzenesulfonic acid or octadecylbenzenesulfonic acid; a potassium salt of an organic phosphorous acid partial ester such as diethyl phosphite, diisopropyl phosphite, diphenyl phosphite, dibutyl phosphite or dilauryl phosphite; or the like.

These potassium compounds can be added in an amount of 0.005 to 0.5 moles per gram atomic equivalent of alkali metal of initiator. Less than 0.005 mole results in no appearance of the effect of adding the potassium compound (improvement in reactivity of the initiator, randomization of the aromatic vinyl compound or giving of the single chain), whereas exceeding 0.5 mole results in a decrease in polymerization activity to cause productivity to substantially decrease, and in a decrease in modification efficiency at the time when the reaction for modifying the polymer terminal with the functional group is conducted.

Further, it is also possible to add the following coupling agents in combination with the amino group-containing alkoxysilane compounds used in the invention.

The coupling agents which are used in combination with the amino group-containing alkoxysilane compounds and allowed to react with the polymerization active terminals include at least one compound selected from the group consisting of (a) an isocyanate compound and/or an isothiocyanate compound, (b) an amide compound and/or an imide compound, (c) a pyridyl-substituted ketone compound and/or a pyridyl-substituted vinyl compound, (d) a silicon compound, (e) an ester compound, (f) a ketone compound and (g) a tin compound.

Of these compounds, specific examples of the isocyanate compounds or the isothiocyanate compounds, which are component (a), preferably include 2,4-tolylene diisocyanate, 2,6tolylene diisocyanate, diphenylmethane diisocyanate, polymeric type diphenylmethane diisocyanate (C-MDI), isophorone diisocyanate, hexamethylene diisocyanate, 1,3,5-benzene triisocyanate, phenyl-1,4-diisothiocyanate and the like.

Specific examples of the amide compounds or the imide compounds, which are component (b), preferably include amide compounds such as succinamide, phthalamide, N,N,N',N'-tetramethylphthalamide, oxamide and N,N,N',N'-tetramethyloxamide; and imide compounds such as succinimide, N-methylsuccinimide, maleimide, N-methylmaleimide, phthalimide and N-methylphthalimide.

Specific examples of the pyridyl-substituted ketone compounds or the pyridyl-substituted vinyl compounds, which are component (c), preferably include dibenzylpyridine, diacetylpyridine, divinylpyridine and the like.

Specific examples of the silicon compounds, which are component (d), preferably include dibutyldichlorosilicon, methyltrichlorosilicon, methyldichlorosilicon, tetrachlorosilicon, triethoxymethylsilane, triphenoxymethylsilane, trimethoxysilane, methyltriethoxysilane, 4,5-epoxyheptyl-methyldimethoxysilane, bis(triethoxysilylpropyl) tetrasulfide and the like.

Specific examples of the ester compounds, which are component (e), include diethyl adipate, diethyl malonate, diethyl phthalate, diethyl glutarate, diethyl maleate and the like.

Specific examples of the ketone compounds, which are component (f), preferably include N,N,N',N'-tetramethyl-4,4'-diaminobenzophenone, N,N,N',N'-tetraethyl(4,4'-diamino)benzophenone, N,N-dimethyl-1-aminobenzoquinone, N,N,N',N'-tetramethyl-1,3-diaminobenzoquinone, N,N-dimethyl-1-aminoanthraquinone, N,N,N',N'-tetramethyl-1,4-diaminoanthraquinone and the like.

Specific examples of the tin compounds, which are component (g), preferably include tetrachlorotin, tetrabromotin, trichlorobutyltin, trichloromethyltin, trichlorooctyltin, dibromodimethyltin, dichlorodimethyltin, dichlorodibutyltin, dichlorodioctyltin, 1,2-bis(trichlorostannyl)ethane, 1,2 -bis(methyldichlorostannyl)ethane, 1,4-bis(trichlorostannyl)butane, 1,4-bis(methyldichlorostannyl)butane, ethyltin tristearate, butyltin trisoctanoate, butyltin trisstearate, butyltin trislaurate, dibutyltin bisoctanoate, dibutyltin bisstearate, dibutyltin bislaurate and the like.

These compounds which are used in combination with the amino group-containing alkoxysilane compounds and allowed to react with the polymerization active terminals can be used either alone or in combination of two or more of them.

The second production process of the invention will be described below.

The polymerization reaction according to the lithium amide initiator whose primary amino group is protected and the reaction with the alkoxysilane compound for obtaining (co)polymer rubber (I) of the invention are usually conducted within the temperature range of 0 to 120° C., under either constant temperature conditions or elevated temperature conditions. The hydrolysis for deblocking the primary amino group protected is conducted by adding a 2-fold or more molar excess of water or acidic water in relation to the lithium amide initiator whose primary amino group is protected to conduct the reaction for 10 minutes or more, preferably for 30 minutes or more. The polymerization system may be either a batch polymerization system or a continuous polymerization system.

It should be understood that the matters described for the first production process are applied to matters which are not described herein for the second production process, as such or with modifications obvious to one skilled in the art.

The lithium amide initiators represented by the above-mentioned formula (5) include, for example, 3-[N,N-bis(trimethylsilyl)]-1-propyllithium, 3-[N,N-bis(trimethylsilyl)]-2-methyl-1-propyllithium, 3-[N,N-bis(trimethylsilyl)]-2,2-dimethyl-1-propyllithium, 4-[N,N-bis(trimethylsilyl)]-1-butyllithium, 5-[N,N-bis(trimethylsilyl)]-1-pentyllithium and 8-[N,N-bis(trimethylsilyl)]-1-octyl-lithium.

The lithium amide initiators represented by the above-mentioned formula (6) include, for example, 3-(2,2,5,5-tetramethyl-2,5-disila-1-azacyclopentane)-1-propyllithium, 2-methyl-3-(2,2,5,5-tetramethyl-2,5-disila-1-azacyclopentane)-1-propyllithium, 2,2-dimethyl-3-(2,2,5,5-tetramethyl-2,5-disila-1-azacyclopentane)-1-propyllithium, 4-(2,2,5,5-tetramethyl-2,5-disila-1-azacyclopentane)-1-butyllithium and 6-(2,2,5,5-tetramethyl-2,5-disila-1-azacyclopentane)-1-hexyllithium.

Further, as the above-mentioned lithium amide initiator, there may be used a synthetic compound obtained by reacting a corresponding halide and an organic lithium compound in a hydrocarbon solvent. The reaction of the halide and the organic lithium may be previously conducted in a reaction vessel different from a polymerization reactor.

The halides corresponding to the above-mentioned lithium amide initiators include the following formula (8) or (9):

$(R^4R^5R^6Si)_2$—N—$R^1$—X (8)

wherein $R^1$, $R^4$, $R^5$ and $R^6$ have the same meanings as given for the above-mentioned formula (3), and X is a halogen atom,

[Formula 7]

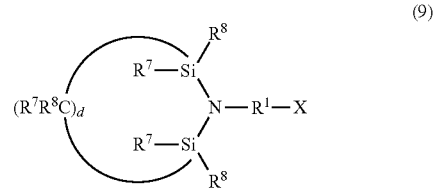

(9)

wherein $R^1$ has the same meaning as given for the above-mentioned formula (3), $R^7$ and $R^8$ are each independently hydrogen, an alkyl group having 1 to 20 carbon atoms or an aryl group, and d is an integer of 1 to 7.

Further, the alkoxysilane compounds represented by the above-mentioned formula (7) include, for example, tetramethoxysilane, tetraethoxysilane, tetrapropoxysilane, tetrabutoxysilane, tetraphenoxysilane, tetratoluyloxysilane, methyltrimethoxysilane, methyltriethoxysilane, methyltripropoxysilane, methyltributoxysilane, methyltriphenoxysilane, ethyltrimethoxysilane, ethyltriethoxysilane, ethyltripropoxysilane, ethyltributoxysilane, ethyltriphenoxysilane, dimethyldimethoxysilane, dimethyldiethoxysilane, dimethyldipropoxysilane, dimethyldibutoxysilane, dimethyldiphenoxysilane, diethyldimethoxysilane, diethyldiethoxysilane, diethyldipropoxysilane, diethyldibutoxysilane, diethyldiphenoxysilane, vinyltrimethoxysilane, vinyltriethoxysilane, vinyltripropoxysilane, vinyltributoxysilane, vinyltriphenoxysilane, allyltriphenoxysilane, octenyltrimethoxysilane, phenyltrimethoxysilane, phenyltriethoxysilane, phenyltripropoxysilane, phenyltributoxysilane, phenyltriphenoxysilane, trimethoxychlorosilane, triethoxychlorosilane, tripropoxychlorosilane, tributoxychlorosilane, triphenoxychlorosilane, dimethoxydichlorosilane, dipropoxydichlorosilane and diphenoxydichlorosilane.

The weight average molecular weight of (co) polymer rubber (I) of the invention is from 1,000 to 90,000, and preferably from 50,000 to 70,000. Less than 1,000 results in insufficient breaking strength, wear resistance, low hysteresis loss properties and the like of the resulting rubber composition, whereas exceeding 90,000 results in reaction of the amino group and the alkoxysilyl group in component (I) with carbon black or silica to increase melt viscosity at the time of kneading, which causes inferior processability. In the rubber composition of the invention, when silica or carbon black is incorporated into the rubber composition mainly comprising components (I) and (II), the use of the rubber having a relatively low weight average molecular weight of 1,000 to 90,000 as (co)polymer rubber (I) allows the amino group and the alkoxysilyl group of component (I) to react with carbon black or silica to apparently increase the molecular weight. However, it does not lead to a significant increase in melt viscosity at the time of kneading. On the other hand, it becomes possible to incorporate these fillers into the rubber composition in large amounts and homogeneously because of excellent affinity for these fillers.

Conjugated Diene-Based (Co)polymer Rubber (II):

Then, (co)polymer rubbers (II) used in the invention include but are not limited to, for example, a polymer rubber of a conjugated diene monomer such as 1,3-butadiene, isoprene, 2,3-dimethyl-1,3-butadiene or chloroprene, and a copolymer rubber of the above-mentioned conjugated diene monomer and another monomer, other than component (I). When used as a rubber for a tire, it is particularly preferred to be a random copolymer rubber obtained by copolymerizing monomers containing the above-mentioned conjugated diene monomer, an olefinic unsaturated nitrile monomer such as acrylonitrile or methacrylonitrile, an aromatic vinyl monomer such as styrene, 2-methylstyrene, α-methylstyrene, 2,4-dimethylstyrene, 4-tert-butylstyrene or tert-butoxystyrene, and another monomer.

(Co)polymer rubber (II) is preferably a conjugated diene-based (co)polymer rubber 30 to 100% by weight of which has at least one functional group of an alkoxysilyl group, an amino group, a hydroxyl group and an epoxy group, a tin atom or silicon atom, when the rubber is taken as 100% by weight. This sufficiently improves the tan δ and wear resistance of vulcanized rubber obtained using the rubber composition containing the conjugated diene-based (co)polymer rubber having the above-mentioned functional group.

The functional group can be introduced into a rubber molecule by copolymerizing a monomer having the above-mentioned functional group at the time when the conjugated diene-based (co)polymer rubber is produced. Further, the (co)polymer rubber having the tin atom or the silicon atom can be obtained by coupling a tin compound or a silicon compound with a living anion of the conjugated diene-based (co)polymer rubber.

The alkoxysilyl group-containing monomers include (meth)acryloxymethyltrimethoxysilane, (meth)acryloxydimethyldimethoxysilane, γ-(meth)acryloxypropyltrimethoxysilane, γ-(meth)acryloxypropylmethyldimethoxysilane, γ-(meth)acryloxypropylmethyldiphenoxysilane, γ-(meth)acryloxypropylmethyldibenzyloxysilane and the like.

The amino group-containing monomers are preferably tertiary amino group-containing monomers, and include (a) dialkylaminoalkyl (meth) acrylates such as dimethylaminomethyl (meth)acrylate, 2-(di-n-propylamino)ethyl (meth) acrylate, 2-dimethylaminopropyl (meth)acrylate and 2-(di-n-propylamino) propyl (meth)acrylate, (b) N-dialkylaminoalkyl group-containing unsaturated amides such as N-dimethylaminomethyl(meth)acrylamide and N-(2-dimethylaminoethyl)-(meth)acrylamide, (c) tertiary amino group-containing vinyl aromatic compounds such as N,N-dimethyl-p-aminostyrene, dimethyl(p-vinylbenzyl)amine, dimethyl(p-vinylphenethyl)-amine, dimethyl(p-vinylbenzyloxymethyl)amine, dimethyl[2-(p-vinylbenzyloxy)ethyl]amine and 2-vinylpyridine, and the like.

Of these, dialkylaminoalkyl (meth)acrylates and tertiary amino group-containing vinyl aromatic compounds are preferred.

The hydroxyl group-containing monomers include (a) hydroxyalkyl (meth)acrylates such as 2-hydroxyethyl (meth)-acrylate and 2-hydroxypropyl (meth)acrylate, (b) mono-(meth)acrylates of polyalkylene glycols (the number of alkylene glycol units is, for example, 2 to 23) such as polyethylene glycol and polypropylene glycol, (c) hydroxyl group-containing unsaturated amides such as N-hydroxymethyl(meth)acrylamide, N-(2-hydroxyethyl)(meth)acrylamide and N,N-bis(2-hydroxyethyl)(meth)acrylamide, (d) hydroxyl group-containing vinyl aromatic compounds such as o-hydroxystyrene, o-hydroxy-α-methylstyrene and p-vinylbenzyl alcohol, (e) (meth)allyl alcohol and the like. Of these, hydroxyalkyl (meth)acrylates and hydroxyl group-containing vinyl aromatic compounds are preferred.

The epoxy group-containing monomers include (meth)acryl glycidyl ether, glycidyl (meth)acrylate, 3,4-oxycyclohexyl (meth)acrylate and the like. The monomers having these specific functional groups may each be used alone or in combination of two or more of them.

The content of repeating units of the above-mentioned various monomers constituting the above-mentioned conjugated diene-based (co)polymer rubber (II) is preferably from 0.1 to 10% by weight, and particularly preferably from 0.1 to 5% by weight. When this content is less than 0.1% by weight, the affinity of conjugated diene-based (co)polymer rubber (II) for the filler such as silica becomes insufficient, sometimes resulting in insufficient improvement in the tan δ, wear resistance and the like of the resulting vulcanized rubber. On the other hand, when this content exceeds 10% by weight, conjugated diene-based (co)polymer rubber (II) tends to strongly coagulate with the filler such as silica, resulting in reduced processability.

The above-mentioned functional group can be introduced into a rubber molecule by using a polymerization initiator or polymerization terminator having the functional group at the time when conjugated diene-based (co)polymer rubber (II) is produced.

Such polymerization initiators include a reaction product of an organic alkali metal compound with a secondary amine compound or a tertiary amine compound. As the secondary amine compound, there can be used dimethylamine, diethylamine, dipropylamine, di-n-butylamine, di-sec-butylamine, di-pentylamine, dihexylamine, di-n-octylamine, di-(2-ethylhexyl)amine, di-cyclohexylamine, N-methylbenzylamine, di-allylamine, piperidine, pyrrolidine, morpholine or the like.

As the tertiary amine compound, there can be used N,N-dimethyl-o-toluidine, N,N-dimethyl-p-toluidine, N,N-dimethyl-m-toluidine, α-picoline, β-picoline, γ-picoline or the like.

The organic alkali metal compound is preferably an organic lithium compound such as ethyllithium, propyllithium, n-butyllithium, sec-butyllithium t-butyllithium, hexyllithium or a mixture thereof, and n-butyllithium and sec-butyllithium are particularly preferred.

The reaction of the secondary amine compound or the tertiary amine compound with the organic alkali metal compound is required to be conducted at a molar ratio of active hydrogen in a structure of the secondary amine compound or active hydrogen in a structure of the tertiary amine compound to the organic alkali metal compound ranging from 1:0.2 to 1:5.0. This molar ratio is preferably from 1:0.5 to 1:2.0, and more preferably from 1:0.8 to 1:1.2.

Further, as the above-mentioned polymerization terminator having the specific functional group, there can be used an epoxy group-containing polymerization terminator represented by the following general formula (10):

[Formula 8]

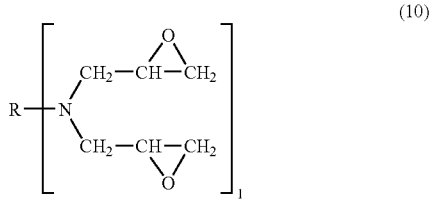

(10)

wherein R is a hydrocarbon group having 1 to 20 carbon atoms, an organic group having no active hydrogen or a silicon compound, and the hydrocarbon group having 1 to 20 carbon atoms or the organic group having no active hydrogen is an alkyl, alkylene, cycloalkyl, aryl or arylene group, or another organic group having no active hydrogen such as —OH, —SH or —NH— in its molecule. In this case, when two or more amino groups are contained in one molecule, it is preferred that the distance between the amino groups is 12 or less by the number of carbon atoms. 1 is a number of 1 or more, preferably from 1 to 4, and particularly preferably 2.

As the polymerization terminator, there can also be used an alkoxyl silyl group-containing polymerization terminator represented by the following general formula (11):

$$X_n Si(OR')_m R''_{4-m-n}$$ (11)

wherein X is a halogen atom, and preferably a chlorine atom, a bromine atom or a iodine atom; R' is a hydrocarbon group having 1 to 20 carbon atoms, preferably 4 to 20 carbon atoms, that is to say, OR' is an alkoxyl group having 1 to 20 carbon atoms, and preferably a non-hydrolyzable alkoxyl group having 4 to 20 carbon atoms, or the like; R" is an alkyl group having 1 to 20 carbon atoms, a halogenated alkyl group having 1 to 20 carbon atoms or an aryl group having 6 to 20 carbon atoms; m is a number of 1 to 4; n is a number of 0 to 2; and the sum of m and n is 2 to 4.

The above-mentioned alkoxysilyl group-containing polymerization terminators include tetraphenoxysilane, methyltris(2-ethylhexyloxy)silane, ethyltris(2-ethylhexyloxy)silane, methyltriphenoxysilane, ethyltriphenoxysilane, vinyltris(2-ethylhexyloxy)silane, vinyltriphenoxysilane, methylvinylbis(2-ethylhexyloxy)silane, ethylvinyldiphenoxysilane, tri-tert-butoxymonochlorosilane, triphenoxymonochlorosilane, monochloromethyldiphenoxysilane, monochloromethylbis(2-ethylhexyloxy)silane, monobromoethyldiphenoxysilane, monobromovinyldiphenoxysilane, monobromoisopropenylbis(2-ethylhexyloxy)silane, dichloro-di-tertbutoxysilane, ditolyldichlorosilane, di-tert-butoxydiiodosilane, diphenoxydiiodosilane, methyltris(2-methylbutoxy)-silane, vinyltris(2-methylbutoxy)silane, monochloromethylbis(2-methylbutoxy)silane, vinyltris(3-methylbutoxy)silane and the like. Of these, methyltriphenoxysilane, ethyltriphenoxysilane and vinyltris(2-methylbutoxy)silane are preferred.

When the conjugated diene-based (co)polymer rubbers having these specific functional groups are used, the rubbers react with silanol groups of silica or quinones of carbon black, so that the affinity of the rubbers for silica is enhanced to obtain a more sufficient reinforcing effect.

The weight average molecular weight of the above-mentioned conjugated diene-based (co)polymer rubber (II) in terms of polystyrene as measured by GPC (gel permeation chromatography) is from 100,000 to 2,000,000, and preferably from 150,000 to 1,500,000. When the weight average molecular weight is less than 100,000, the wear resistance of the vulcanized rubber is deteriorated, and the tan δ increases in some cases. On the other hand, exceeding 2,000,000 results in reduced processability of the rubber composition.

Although a method for producing the above-mentioned conjugated diene-based (co)polymer rubber (II) is not particularly limited, it can be produced according to solution polymerization, emulsion polymerization and the like. Of these, solution polymerization is preferred.

This solution polymerization can be performed by usual methods, which include a method of putting a predetermined monomer(s) in a reactor together with an organic solvent, adjusting the temperature of the reactor, thereafter, adding a polymerization initiator to start the polymerization, and terminating the polymerization with a deactivating agent such as various functional group-containing compounds at the point of time when the polymerization has been fully made.

As the polymerization initiator, a lithium-based initiator is abundantly used, and an organolithium compound is particularly preferred. The organolithium compounds include (1) alkyllithium compounds such as n-butyllithium, sec-butyllithium and tert-butyllithium, (2) alkylenedilithium compounds such as 1,4-dilithiumbutane, (3) aromatic hydrocarbon lithium compounds such as phenyllithium, stilbenelithium, diisopropenylbenzenelithium, and a reaction product of the above-mentioned alkyllithium compound or the like with divinylbenzene or the like, (4) polynuclear hydrocarbon lithium compounds such as lithium naphthalene, (5) other lithium compounds such as amino lithium and tributyltin lithium, and the like.

In this solution polymerization, in order to randomize styrene to adjust a microstructure of a butadiene unit, there can be used an ether compound such as dimethoxybenzene or tetrahydrofuran, a tertiary amine compound such as triethylamine or pyridine, or the like, in addition to the polymerization initiator. Further, an activating agent such as potassium benzoate or potassium dodecylbenzenesulfonate can also be used.

As the organic solvent, there can be used a hydrocarbon solvent such as n-hexane, cyclohexane, heptane or benzene. Further, although the polymerization temperature and polymerization time are not particularly limited, the polymerization temperature can be from 0 to 130° C., and particularly, it is preferably from 10 to 100° C.

On the other hand, the polymerization time can be from 5 minutes to 24 hours, and particularly, it is preferably from 10 minutes to 10 hours. The polymerization system may be either a batch polymerization system or a continuous polymerization system.

It is necessary to prevent a halogen compound, oxygen, water, carbon dioxide and the like which have a function of deactivating the polymerization initiator such as the organic lithium compound, from being mixed into the polymerization system.

Various additives such as an antiaging agent are added to the polymerization solution after the polymerization as needed, and desolvation was performed by steam stripping or the like, followed by drying with a heated roll or the like, thereby being able to obtain conjugated diene-based (co)polymer rubber (II). When an extending oil is added, an extended rubber can be prepared by a similar treatment. The extending oils include aromatic, napthenic and paraffinic extending oils which have been ordinarily used as extending oils for rubber, and one containing an aromatic extending oil in an amount of 15 to 50% by weight is particularly preferred.

When the above-mentioned conjugated diene-based (co)polymer rubber (II) is produced by emulsion polymerization, any method may be used as long as it is a general method. Such methods include a method of emulsifying a predetermined monomer(s) in an aqueous medium in the presence of an emulsifier, initiating the polymerization by using a radical polymerization initiator, and then terminating the polymerization by using a polymerization terminator at the point of time when a predetermined conversion has been achieved.

As the emulsifier, there is abundantly used an anionic surfactant such as a rosin acid salt, as well as a potassium or sodium salt of a long chain fatty acid having 10 or more carbon atoms such as oleic acid or stearic acid.

Further, as the radical polymerization initiator, there can be used an organic peroxide such as benzoyl peroxide, di-tert-butyl peroxide or dicumyl peroxide. Furthermore, a redox catalyst and the like can also be used, as well as a diazo compound represented by azobisisobutyronitrile, an inorganic peroxide represented by potassium persulfate, and the like.

These radical polymerization initiators may be used either alone or in combination of two or more of them.

After termination of the polymerization, unreacted monomers are removed from a formed conjugated diene-based (co)polymer rubber latex as needed by means of steam distillation or the like, and the conjugated diene-based (co)polymer rubber is aggregated as crumb. This crumb is washed, dehydrated and then dried with a drier or the like, thereby being able to obtain conjugated diene-based (co)polymer rubber (II).

Further, it is also possible to prepare an oil-extended rubber by mixing an aqueous solution of a surfactant with an extending oil to prepare an emulsified product of the extending oil by stirring or the like, and then, mixing this with a conjugated diene-based (co)polymer rubber latex to perform aggregation. As the extending oil, there can be used one described above. The Mooney viscosity [$ML_{1+4}$ (100° C.)] of the above-mentioned oil-extended rubber is preferably from 20 to 150 and particularly preferably from 30 to 100.

The Mooney viscosity [$ML_{1+4}$ (100° C.)] of the above-mentioned rubber component containing the above-mentioned conjugated diene-based (co)polymer rubber (II) is preferably from 20 to 200 and particularly preferably from 30 to 150. When the Mooney viscosity is less than 20, the wear resistance of the vulcanized rubber is deteriorated in some cases. Exceeding 200 results in a tendency to deteriorate the processability of the rubber.

Further, when the tin atom-containing or silicon atom-containing (co)polymer rubber is used as component (II), the conjugated diene or the conjugated diene and the aromatic vinyl compound may be (co)polymerized using the organic lithium compound and/or the lithium amide compound as the initiator, and then, a tin compound or a silicon compound may be allowed to react as a coupling agent.

Here, the tin compounds include the above-mentioned tin compound (g) used as the coupling agent for (co)polymer rubber (I), and the silicon compounds similarly include the above-mentioned silicon compound (d) used as the coupling agent for (co)polymer rubber (I).

These tin compounds and/or silicon compounds are used in (co)polymer rubber (II) in an amount yielding 50 to 600 ppm, preferably about 100 to 500 ppm, in terms of tin atom and/or silicon atom. Further, it is preferred that the tin compounds and/or silicon compounds are allowed to react in an amount of 0.1 to 1.0 equivalent, preferably in an amount of 0.2 to 0.6 equivalent, based on the living polymer chain.

For the compounding ratio of the above components (I) and (II), component (I) is from 0.5 to 35% by weight, and preferably from 1 to 30% by weight, and component (II) is from 99.5 to 65% by weight, and preferably from 99 to 70% by weight (with the proviso that (I)+(II)=100% by weight). When component (I) is less than 0.5% by weight, the effect of improving processability is not observed in some cases. On the other hand, exceeding 35% by weight results in deterioration of the wear resistance of the vulcanized rubber in some cases.

Oil Extension:

An extending oil such as an aromatic process oil or a naphthenic process oil, or a liquid polymer having a weight average molecular weight of 150,000 or less may be added to components (I) and (II) used in the invention, thereby decreasing the Mooney viscosity, which also makes it possible to use without a problem in processability.

The extending oil used is not particularly limited, as long as it is an extending oil or a softening agent ordinarily used in a diene-based rubber. However, a mineral oil-based extending oil is preferably used. In general, the mineral oil extending oils are a mixture of an aromatic oil, an alicyclic oil and an aliphatic oil, and classified into the aromatic family, alicyclic family and aliphatic family, according to the amount ratio thereof. Any of them can be used in the present invention. Above all, an aromatic mineral oil (aromatic oil) having a viscosity-gravity constant (V.G.C value) of 0.900 to 1.049 and an aliphatic mineral oil (naphthenic oil) having a V.G.C of 0.800 to 0.899 are preferably used in terms of low hysteresis loss properties/wet-skid resistance.

In the invention, after the extending oil has been added during or after the production of components (I) and/or (II) to prepare an oil-extended rubber, the filler (silica and/or carbon black) may be incorporated therein, or after components (I) and (II) have been blended with the filler, the extending oil may be incorporated therein. Preferred is the former.

Further, for the oil-extended amount in the oil-extended rubber composition of the invention, the amount of the extending oil is from 10 to 50 parts by weight, and preferably from 15 to 45 parts by weight, based on 100 parts by weight of the total amount of components (I) and (II) which are rubber components. When the amount of the extending oil is less than 10 parts by weight, the effect of adding it is not observed in some cases. On the other hand, exceeding 50 parts by weight results in reduced breaking strength.

Filler:

Further, it is preferred that the filler is incorporated into the rubber composition of the invention.

The filler which is incorporated into the rubber composition of the invention is not particularly limited, as long as it is an inorganic compound. Examples thereof include silica, carbon black (including a carbon-silica dual phase filler) clay, calcium carbonate, magnesium carbonate and the like. Above all, silica, a combination of carbon black and silica, a carbon-silica dual phase filler or a combination of a carbon-silica dual phase filler and carbon black and/or silica is preferably used.

In addition, a lamellar inorganic compound can be used. Examples thereof include swellable mica, montmorillonite, bentonite, saponite, hectorite, organic modified swellable mica, organic modified montmorillonite, organic modified bentonite, organic modified saponite, organic modified hectorite and the like.

As the filler, particularly for low fuel consumption tire application, the use of silica is preferred. The silica includes, for example, wet process silica, dry process silica and synthetic silicate silica. High in reinforcing effect is silica having a small particle size. One of a small particle size and high aggregation type (high surface area, high oil absorption) is good in dispersibility in the rubber, so that it is preferred in respect to physical properties and processability. The average particle size of the silica is preferably from 5 to 60 μm, and more preferably from 10 to 35 μm, by the primary particle size. Further, the specific surface area (BET method) thereof is preferably from 45 to 280 $m^2/g$.

Furthermore, when good wear resistance and breaking strength are expected as the filler, carbon black is suitably used. As the carbon black, preferred is carbon black manufactured by the furnace process and having a nitrogen adsorption specific surface area of 50 to 200 $m^2/g$ and a DBP oil absorption of 80 to 200 ml/100 g, and examples thereof include one of the FEF class, the HAF class, the ISAF class, the SAF class or the like. One of a high aggregation type is preferred among others.

Moreover, it is also possible to incorporate the carbon black and the silica together. By using the carbon black and the silica together as the fillers, these fillers having the reinforcing action are homogeneously finely dispersed in the rubber, thereby being able to provide the one excellent in roll processability, extrusion properties and the like.

In the invention, the carbon-silica dual phase filler can be incorporated either alone or together with the carbon black and/or the silica.

Excellent advantages similar to those obtained when the carbon black and the silica are used together can be obtained by using the carbon-silica dual phase filler, even when it is used alone. The carbon-silica dual phase filler is so-called silica coating carbon black in which silica is chemically bonded to the surface of carbon black, and commercially available from Cabot Corporation as CRX2000, CRX2002 or CRX2006 (trade name).

In the invention, the carbon-silica dual phase filler can be used in combination with a filler other than that. There is no particular limitation on the simultaneously usable filler, and examples thereof include the above-mentioned carbon black and/or silica, clay, calcium carbonate, magnesium carbonate and the like. The carbon black and/or silica are preferred among others.

Rubber-Filler Composite:

In the rubber composition of the invention, when the above-mentioned filler is incorporated, it is preferred in terms of securing uniformity and processability of the resulting composition that a filler composite in which the filler has been mixed with a mixed rubber composition of (co)polymer rubber (I) and (co)polymer rubber (II) is previously prepared.

Further, the filler may be blended with the mixed rubber composition of component (I) and component (II) (a wet blend method), or dry blended with the mixture of component (I) and component (II) (a dry blend method).

Here, in the case of the wet blend method, examples thereof include a method of adding the filler to a mixed polymer rubber solution of conjugated diene-based (co)polymer rubbers (I) and (II), followed by mixing in a slurry state.

This method can operationally omit a process of mixing components (I) and (II), and is preferred because of excellent mixing uniformity of both. When the filler is added to the polymer solution, it is preferably added after the termination of the polymerization, for example, after the addition of the terminal modifier or after the addition of the polymerization terminator. A necessary amount of the filler is added to the polymer rubber solution containing an organic solvent, and mixed well in a slurry state (a first process) Then, (1) a crumb is obtained by a steam stripping method of blowing steam into the polymer rubber slurry solution containing the filler, or (2) the polymer rubber slurry solution containing the filler is directly desolvated by a means such as an extruder or a devolatilizer to separate the rubber-inorganic compound composite from the solvent (a second process). The resulting wet rubber-inorganic compound composite is dried with a vacuum drier, a hot air dryer, a roll or the like as needed (a third process), thereby being able to isolate the desired rubber-filler composite.

Further, in the case of the dry blend method, it is also possible to blend a mixed rubber of conjugated diene (co) polymer rubbers (I) and (II) with the filler to prepare the rubber-inorganic compound composite. In this case, as a blending process, there is employed a single-screw extruder, a twin-screw extruder, a Banbury mixer, a roll, a kneader, a plastomill or the like, and the kneading temperature is suitably from 50 to 200° C.

In this case, the amount of the filler incorporated is from 1 to 150 parts by weight, and preferably from 20 to 120 parts by weight, based on 100 parts by weight of the total of the rubber components containing components (I) and (II). Less than 1 part by weight results in insufficiency of the improving effect due to the filler, whereas exceeding 150 parts by weight results in too small the amount of the rubber based on the filler, which makes it difficult to take out the composite comprising the rubber and the filler.

Preparation of Rubber Composition

The (oil-extended) rubber composition of the invention is prepared as a rubber composition by incorporating another rubber component, a filler and the like, as well as components (I) and (II) which are the (co)polymer rubbers used in the invention.

That is to say, as for the rubber composition of the invention, another rubber component such as natural rubber, polyisoprene rubber, polybutadiene rubber or emulsion-polymerized styrene-butadiene rubber, a variety of filler such as carbon black or silica, and a variety of compounding agent, as well as components (I) and (II) (including the oil-extended (co) polymer rubber) of the invention, are kneaded by means of a roll or a Banbury mixer, and sulfur, a vulcanization accelerator and the like are added to prepare the rubber composition, which can be used as a belt, another vibration-proof rubber or another industrial product, starting with a rubber for a tire such as a tread, a sidewall or a carcass, as well as a vibration-damping material for an constraint board.

Here, as for the ratio of the rubber component containing components (I) and (II) in the rubber composition of the invention to the filler, the filler is from 1 to 150 parts by weight, preferably from 20 to 120 parts by weight, based on 100 parts by weight of the rubber components. Less than 1 part by weight results in insufficiency of the improving effect due to the filler, whereas exceeding 150 parts by weight results in too hard a material prepared to be put to practical use.

In the rubber composition of the invention, in order to improve hysteresis loss characteristics, it is desirable to incorporate at least 1 part by weight of the filler, preferably 5 to 100 parts by weight of silica, and further 0.5 to 20% by weight of the silane coupling agent based on silica. When the amount of silica incorporated is less than 1 part by weight, improvement of hysteresis loss characteristics is not sufficient.

In addition, the silica (including the carbon-silica dual phase filler) and the silane coupling agent may be incorporated either in the preparation of the above-mentioned rubber-inorganic compound composite of the invention or in the preparation of the rubber composition of the invention.

Here, the silane coupling agent is used in order to increase its reinforcing effect when the silica is used as the filler. The silane coupling agent means a compound having both a constituent component reactable with the silica surface such as an alkoxysilyl group and a constituent component reactable with the rubber, particularly a carbon-carbon double bond, such as a polysulfide, a mercapto group or an epoxy group, in its molecule.

The silane coupling agents include, for example, bis-(3-triethoxysilylpropyl) tetrasulfide, bis(2-triethoxysilylethyl) tetrasulfide, 3-mercaptopropyltrimethoxysilane, 3-triethoxysilylpropyl-N,N-dimethylthiocarbamoyl tetrasulfide, 3-triethoxysilylpropylbenzothiazole tetrasulfide and the like. The use of the silane coupling agent can increase its reinforcing effect, when the silica is used or the carbon black and silica are used together as the filler, or when the carbon-silica dual phase filler is used as the filler.

By the way, in the rubber composition of the invention, a vulcanizing agent can be used preferably within the range of 0.5 to 10 parts by weight, and more preferably within the range of 1 to 6 parts by weight, based on 100 parts by weight of all rubber components.

The vulcanizing agents include typically sulfur, and additionally a sulfur-containing compound, a peroxide and the like.

Further, a vulcanization accelerator such as a sulfenamide-based, guanidine-based or thiuram-based accelerator may be used in an amount according to need. Furthermore, zinc white, a vulcanization auxiliary, an antiaging agent, a processing aid and the like may be used in an amount according to need.

A method for kneading the rubber composition of the invention is not particularly limited. However, when the filler contains silica, the kneading can also be carried out by the following method, in order to sufficiently achieve reinforcement with silica and to more improve the physical properties of the vulcanized rubber.

The methods for kneading the rubber composition of the invention containing the rubber components (including the rubber-inorganic compound composite), silica, the silane coupling agent, zinc white and the vulcanizing agent include (a) a method of incorporating silica into rubber components (I) and (II), followed by kneading to prepare a first rubber composition, then, incorporating the silane coupling agent into the first rubber composition, followed by kneading to prepare a second rubber composition, and subsequently, incorporating zinc white and the vulcanizing agent into the second rubber composition, followed by kneading, or (b) a method of incorporating silica into rubber components (I) and (II), followed by kneading to prepare a first rubber composition, then, incorporating the silane coupling agent into the first rubber composition, followed by kneading, further incorporating zinc white, continuing the kneading to prepare a second rubber composition, and subsequently incorporating the vulcanizing agent into the second rubber composition, followed by kneading.

According to the above-mentioned kneading methods, no silane coupling agent coexists in kneading the rubber components (including the rubber-inorganic compound composite) with silica, so that the kneading temperature can be elevated to about 170 to about 180° C. Accordingly, silica can be sufficiently dispersed by fewer kneading times.

Various compounding agents for the rubber composition of the invention are not particularly limited. However, in order to improve processability at the time of kneading or to more improve a balance among wet-skid characteristics, low hysteresis loss and wear resistance, the following compatibilizing agent can also be added at the time of kneading.

The preferred compatibilizing agent is an organic compound selected from an epoxy group-containing compound, a carboxylic acid compound, a carboxylic acid ester compound, a ketone compound, an ether compound, an aldehyde compound, a hydroxyl group-containing compound and an amino group-containing compound, or a silicone compound selected from an alkoxysilane compound, a siloxane compound and an aminosilane compound.

Specific examples of the organic compounds of the compatibilizing agents include the following compounds:

Epoxy group-containing compounds: butyl glycidyl ether, diglycidyl ether, propylene oxide, neopentyl glycol diglycidyl ether, an epoxy resin, epoxidized soybean oil, epoxidized fatty acid ester and the like.

Carboxylic acid esters: adipic acid, octylic acid, methacrylic acid and the like.

Carboxylic acid ester compounds: an acrylic acid ester, diethylene acrylate, ethyl methacrylate, an orthoacetic acid ester, ethyl acetoacetate, butyl acetate, isopropyl acetate, dimethyl carbonate, p-hydroxyphenylacetic acid, a polyester-based plasticizer, stearic acid-based plasticizer and the like.

Ketone compounds: methylcyclohexane, acetylacetone and the like.

Ether compounds: isopropyl ether, dibutyl ether and the like.

Aldehyde compounds: undecylenealdehyde, decylaldehyde, vanillin, 3,4-dimethoxybenzaldehyde, cuminaldehyde and the like.

Amino group-containing compounds: isopropylamine, diisopropylamine, triethylamine, 3-ethoxypropylamine, 2-ethylhexylamine, isopropanolamine, N-ethylethylenediamine, ethyleneimine, hexamethylenediamine, 3-lauryloxypropylamine, aminophenol, aniline, 3-isopropoxyaniline, phenylenediamine, aminopyridine, N-methyldiethanolamine, N-methylethanolamine, 3-amino-1-propanol, ethylamine hydrochloride, n-butylamine hydrochloride and the like.

Hydroxyl group-containing compounds: isopropyl alcohol, butanol, octanol, octanediol, ethylene glycol, methylcyclohexanol, 2-mercaptoethanol, 3-methyl-3-methoxy-1-butanol, 3-methyl-1,5-pentanediol, 1-octadecanol, diethylene glycol, butylene glycol, dibutylene glycol, triethylene glycol and the like.

Above all, epoxy group-containing compounds, amino group-containing compounds and hydroxyl group-containing compounds are preferred.

Specific examples of the silicone compounds of the compatibilizing agents include alkoxysilane compounds: trimethylmethoxysilane, trimethylethoxysilane, dimethyldimethoxysilane, methyltriethoxysilane, methyltriphenoxysilane, tetraethoxysilane, methyldiethoxysilane, vinyltrimethoxysilane and the like;

siloxane compounds: a dimethylsiloxane oligomer, a silicone oil, an amino-modified silicone oil, an epoxy-modified silicone oil, a carboxyl-modified silicone oil, a polyether-modified silicone oil, an alkyl-modified silicone oil, a higher fatty acid ester-modified silicone oil, a higher alkoxy-modified silicone oil, a higher fatty acid-containing silicone oil and the like; and aminosilane compounds: hexamethyldisilazane, nonamethyltrisilazane, anilitrimethylsilane, bis(dimethylamino)dimethylsilane, bis(diethylamino)dimethylsilane, triethylaminosilane and the like, preferably silazane compounds and bis(dimethylamino)dimethylsilane among others.

EXAMPLES

The present invention will be illustrated in greater detail with reference to the following examples, but the scope of the invention should not be construed as being limited by these examples. In the examples, parts and percentages are on a weight basis unless otherwise specified.

Various measurements in the examples were made in accordance with the following methods.

(1) Vinyl Bond Content of Conjugated Diene Moiety

It was determined by infrared absorption spectroscopy (Morello method).

(2) Styrene Component Content

It was determined by preparing a calibration curve by infrared absorption spectroscopy.

(3) Weight Average Molecular Weight (Mw)

The weight average molecular weight (Mw) was determined in terms of polystyrene, using gel permeation chromatography (GPC) (Type 244 manufactured by Waters).

(4) Mooney Viscosity ($ML_{1+4}$, 100° C.)

It was measured by preheating at a temperature of 100° C. for 1 minute with an L rotor with a rotor operation time of 4 minutes in accordance with JIS K6300.

(5) Amino Group Content

It was determined by quantitative determination by "an acid-base titration method in an organic solvent using a perchloric acid-acetic acid solution" described in Robert T. Keen and James S. Fritz, *J. Anal. Chem.*, 24, 564 (1952), according to the following method. The quantitative determination was performed by a calibration curve previously prepared by a tri-n-octylamine solution having a known concentration, using chloroform as the solvent for dissolving a sample and methyl violet as a titration indicator.

(6) Alkoxysilyl Group Content

A copolymer rubber was dissolved in toluene, and reprecipitation purification with methanol was conducted twice, followed by vacuum drying. Then, the alkoxysilyl group content was determined from a calibration curve prepared by the absorption in the vicinity of 1,160 $cm^{-1}$ caused by a Si—C bond according to an infrared absorption spectrum.

(7) Evaluation of Physical Properties of Vulcanizate

A raw material rubber was kneaded in a 250-cc Labo Plastomill according to a compounding formulation shown in Table 4, and then, vulcanized at 145° C. for a specific period of time to obtain a vulcanizate. Using the vulcanizate, various measurements were conducted.

(a) tan δ (70° C.)

It was measured under the conditions of a dynamic strain under tension of 1%, a frequency of 10 Hz and 70° C., using a dynamic spectrometer manufactured by Rheometrix (USA). It is indicated by an index, and a larger value shows lower and better rolling resistance.

(b) Dynamic Frictional Resistance Value (μ)

Using a dynamic friction tester (DF Tester manufactured by Nippo Sangyo Co., Ltd.), μ at a speed of 5 km/hour was measured in accordance with ASTM E-1911-98. It is indicated by an index, and a larger value shows higher and better wet grip.

(c) Wear Resistance (Lambourn Wear Index)

Using a Lambourn type wear tester, it was expressed as the amount of wear at a slip rate of 25%, and the measurement temperature was room temperature. A larger index shows better wear resistance.

(d) Mooney Viscosity ($ML_{1+4}$, 100° C.) of Compounded Rubber

It was measured by preheating at a temperature of 100° C. for 1 minute with an L rotor with a rotor operation time of 4 minutes in accordance with JIS K6300. A larger numerical value shows better processability.

Reference Example 1

Synthesis of Copolymer Rubber A

An autoclave reactor having an internal volume of 5 liters in which the atmosphere was replaced with nitrogen was charged with 2,500 g of cyclohexane, 41.3 g of tetrahydrofuran, 125 g of styrene, 365 g of 1,3-butadiene and 0.05 g of divinylbenzene. After the temperature of the contents in the reactor was adjusted to 20° C., 358 mg of n-butyllithium was added to initiate polymerization. The polymerization was conducted under adiabatic conditions, and the maximum temperature reached 87° C.

At the time when the polymerization conversion reached 99%, 10 g of 1,3-butadiene was added, followed by further polymerization for 5 minutes. Then, 1,720 mg of N,N-bis-(trimethylsilyl)aminopropylmethyldimethoxysilane was added, followed by polymerization for 15 minutes, and 2,6-di-tert-butyl-p-cresol was added to obtain a solution of copolymer rubber A.

Reference Example 2

Synthesis of Copolymer Rubber B

An autoclave reactor having an internal volume of 5 liters in which the atmosphere was replaced with nitrogen was charged with 2,500 g of cyclohexane, 9.3 g of tetrahydrofuran, 50 g of styrene and 440 g of 1,3-butadiene. After the temperature of the contents in the reactor was adjusted to 20° C., 358 mg of n-butyllithium was added to initiate polymerization. The polymerization was conducted under adiabatic conditions, and the maximum temperature reached 87° C.

At the time when the polymerization conversion reached 99%, 10 g of 1,3-butadiene was added, followed by further polymerization for 5 minutes. Then, 725 mg of tin tetrachloride was added, followed by polymerization for 15 minutes, and 2,6-di-tert-butyl-p-cresol was added to obtain a solution of copolymer rubber B.

Reference Example 3

Synthesis of Copolymer Rubber C

An autoclave reactor having an internal volume of 16 liters in which the atmosphere was replaced with nitrogen was continuously charged with 1,3-butadiene at 25.0 g/minute and styrene at 14.05 g/minute as monomers, cyclohexane at 237.1 g/minute and tetrahydrofuran at 3.0 g/minute as solvents, and n-butyllithium at 18.67 mg/minute. The temperature of the reactor was controlled at 75° C.

The polymer rubber solution was continuously discharged at 279.2 g/minute from the first reactor, and silicon tetrachloride was added thereto at 13.6 mg/minute. The resulting solution was continuously introduced into a second reactor to conduct reaction. At an outlet of the second reactor, di-tert-butyl-p-cresol was added in an amount of 0.7 part based on 100 parts of the rubber, thereby obtaining a solution of copolymer rubber C.

TABLE 1

|  | Reference Example 1 | Reference Example 2 | Reference Example 3 |
|---|---|---|---|
| Copolymer Rubber | A | B | C |
| Bonded Styrene Content (%) | 25 | 10 | 36 |
| Vinyl Bond Content (%) | 56 | 42 | 43 |
| Weight Average Molecular Weight (10,000) | 24 | 69 | 105 |

Reference Example 4

Synthesis of Copolymer Rubber D

An autoclave reactor having an internal volume of 5 liters in which the atmosphere was replaced with nitrogen was charged with 2,500 g of cyclohexane, 27 g of tetrahydrofuran, 216 g of styrene and 374 g of 1,3-butadiene. After the temperature of the contents in the reactor was adjusted to 10° C., 7.2 g of n-butyllithium was added to initiate polymerization. The polymerization was conducted under adiabatic conditions, and the maximum temperature reached 92° C.

At the time when the polymerization conversion reached 99%, 10 g of 1,3-butadiene was added, followed by further polymerization for 5 minutes. Then, 44 g of N,N-bis-(trimethylsilyl)aminopropylmethyldimethoxysilane was added, followed by polymerization for 15 minutes, and 2,6-di-tert-butyl-p-cresol was added to obtain a solution of copolymer rubber D.

Reference Example 5

Synthesis of Copolymer Rubber E

An autoclave reactor having an internal volume of 5 liters in which the atmosphere was replaced with nitrogen was charged with 2,500 g of cyclohexane, 27 g of tetrahydrofuran, 216 g of styrene and 374 g of 1,3-butadiene. After the temperature of the contents in the reactor was adjusted to 10° C., 1.5 g of n-butyllithium was added to initiate polymerization. The polymerization was conducted under adiabatic conditions, and the maximum temperature reached 90° C.

At the time when the polymerization conversion reached 99%, 10 g of 1,3-butadiene was added, followed by further polymerization for 5 minutes. Then, 11.4 g of N,N-bis-(trimethylsilyl)aminopropylmethyldimethoxysilane was added, followed by polymerization for 15 minutes, and 2,6-di-tert-butyl-p-cresol was added to obtain a solution of copolymer rubber E.

Reference Example 6

Synthesis of Copolymer Rubber F

An autoclave reactor having an internal volume of 5 liters in which the atmosphere was replaced with nitrogen was charged with 2,500 g of cyclohexane, 27 g of tetrahydrofuran, 216 g of styrene and 374 g of 1,3-butadiene. After the temperature of the contents in the reactor was adjusted to 10° C., 11.8 g of piperidine and 15 g of n-butyllithium were added to initiate polymerization. The polymerization was conducted under adiabatic conditions, and the maximum temperature reached 88° C.

At the time when the polymerization conversion reached 99%, 10 g of 1,3-butadiene was added, followed by further polymerization for 5 minutes. Then, 67.8 g of methyltriphenoxysilane was added, followed by polymerization for 15 minutes, and 2,6-di-tert-butyl-p-cresol was added to obtain a solution of copolymer rubber F.

TABLE 2

|  | Reference Example 4 | Reference Example 5 | Reference Example 6 |
|---|---|---|---|
| Copolymer Rubber | D | E | F |
| Bonded Styrene Content (%) | 36 | 36 | 35 |
| Vinyl Bond Content (%) | 50 | 55 | 47 |
| Weight Average Molecular Weight (10,000) | 0.9 | 4.3 | 0.4 |
| Amino Group Content (mmol/kg) | 207 | 41 | 443 |
| Alkoxysilyl Group Content (mmol/kg) | 198 | 39 | 423 |

Reference Example 7

Synthesis of Copolymer Rubber G

An autoclave reactor having an internal volume of 5 liters in which the atmosphere was replaced with nitrogen was charged with 2,500 g of cyclohexane, 27 g of tetrahydrofuran, 216 g of styrene and 374 g of 1,3-butadiene. After the temperature of the contents in the reactor was adjusted to 10° C., 779 mg of n-butyllithium was added to initiate polymerization. The polymerization was conducted under adiabatic conditions, and the maximum temperature reached 90° C.

At the time when the polymerization conversion reached 99%, 10 g of 1,3-butadiene was added, followed by further polymerization for 5 minutes. Then, 21 g of N,N-bis-(trimethylsilyl)aminopropylmethyldimethoxysilane was added, followed by polymerization for 15 minutes, and 2,6-di-tert-butyl-p-cresol was added to obtain a solution of copolymer rubber G.

Reference Example 8

Synthesis of Copolymer Rubber H

An autoclave reactor having an internal volume of 5 liters in which the atmosphere was replaced with nitrogen was charged with 2,500 g of cyclohexane, 27 g of tetrahydrofuran, 216 g of styrene and 374 g of 1,3-butadiene. After the temperature of the contents in the reactor was adjusted to 10° C., 1.5 g of n-butyllithium was added to initiate polymerization. The polymerization was conducted under adiabatic conditions, and the maximum temperature reached 90° C.

At the time when the polymerization conversion reached 99%, 10 g of 1,3-butadiene was added, followed by further polymerization for 5 minutes. Then, 6.7 g of methyltriphenoxysilane was added, followed by polymerization for 15 minutes, and 2,6-di-tert-butyl-p-cresol was added to obtain a solution of copolymer rubber H.

Reference Example 9

Synthesis of Copolymer Rubber I

An autoclave reactor having an internal volume of 5 liters in which the atmosphere was replaced with nitrogen was charged with 2,500 g of cyclohexane, 27 g of tetrahydrofuran, 216 g of styrene and 374 g of 1,3-butadiene. After the temperature of the contents in the reactor was adjusted to 10° C., 11.8 g of piperidine and 15 g of n-butyllithium were added to initiate polymerization. The polymerization was conducted under adiabatic conditions, and the maximum temperature reached 88° C.

At the time when the polymerization conversion reached 99%, 10 g of 1,3-butadiene was added, followed by further polymerization for 5 minutes. Then, 20 g of methanol was added, followed by polymerization for 15 minutes, and 2,6-di-tert-butyl-p-cresol was added to obtain a solution of copolymer rubber I.

TABLE 3

|  | Reference Example 7 | Reference Example 8 | Reference Example 9 |
|---|---|---|---|
| Copolymer Rubber | G | H | I |
| Bonded Styrene Content (%) | 36 | 36 | 36 |
| Vinyl Bond Content (%) | 51 | 54 | 56 |
| Weight Average Molecular Weight (10,000) | 10 | 4.1 | 4.0 |
| Amino Group Content (mmol/kg) | 18 | 0 | 0 |
| Alkoxysilyl Group Content (mmol/kg) | 18 | 40 | 0 |

Example 1

The solution of copolymer rubber C and the solution of copolymer rubber D were mixed with each other in amounts of 95 g and 5 g, respectively, in terms of solid content, and desolvation was performed by steam stripping. The rubber was dried with a heated roll of 115° C. to obtain a rubber composition. A compounded rubber prepared according to a compounding formulation shown in Table 4, using this rubber composition, was vulcanized, and subjected to evaluation of physical properties. The results thereof are shown in Table 5.

Example 2

The solution of copolymer rubber C and the solution of copolymer rubber F were mixed with each other in amounts of 99 g and 1 g, respectively, in terms of solid content, and desolvation was performed by steam stripping. The rubber was dried with a heated roll of 115° C. to obtain a rubber composition. A compounded rubber prepared according to a compounding formulation shown in Table 4, using this rubber composition, was vulcanized, and subjected to evaluation of physical properties. The results thereof are shown in Table 5.

Example 3

The solution of copolymer rubber C and the solution of copolymer rubber F were mixed with each other in amounts of 70 g and 30 g, respectively, in terms of solid content, and desolvation was performed by steam stripping. The rubber was dried with a heated roll of 115° C. to obtain a rubber composition. A compounded rubber prepared according to a compounding formulation shown in Table 4, using this rubber composition, was vulcanized, and subjected to evaluation of physical properties. The results thereof are shown in Table 5.

Example 4

The solution of copolymer rubber B and the solution of copolymer rubber D were mixed with each other in amounts of 95 g and 5 g, respectively, in terms of solid content, and desolvation was performed by steam stripping. The rubber was dried with a heated roll of 115° C. to obtain a rubber composition. A compounded rubber prepared according to a compounding formulation shown in Table 4, using this rubber composition, was vulcanized, and subjected to evaluation of physical properties. The results thereof are shown in Table 5.

Example 5

The solution of copolymer rubber A and the solution of copolymer rubber E were mixed with each other in amounts of 90 g and 10 g, respectively, in terms of solid content, and desolvation was performed by steam stripping. The rubber was dried with a heated roll of 115° C. to obtain a rubber composition. A compounded rubber prepared according to a compounding formulation shown in Table 4, using this rubber composition, was vulcanized, and subjected to evaluation of physical properties. The results thereof are shown in Table 5.

Example 6

The solution of copolymer rubber C and the solution of copolymer rubber D were mixed with each other in amounts of 95 g and 3 g, respectively, in terms of solid content, and 20 g of an extending oil (T-DAE manufactured by Fuji Kosan Co., Ltd.) was further added. Desolvation was performed by steam stripping, and the rubber was dried with a heated roll of 115° C. to obtain a rubber composition. A compounded rubber prepared according to a compounding formulation shown in Table 4, using this rubber composition, was vulcanized, and subjected to evaluation of physical properties. The results thereof are shown in Table 5.

Comparative Example 1

Only the solution of copolymer rubber B was used in an amount of 100 g in terms of solid content, and desolvation was performed by steam stripping. The rubber was dried with a heated roll of 115° C. to obtain a rubber composition. A compounded rubber prepared according to a compounding formulation shown in Table 4, using this rubber composition, was vulcanized, and subjected to evaluation of physical properties. The results thereof are shown in Table 5.

Comparative Example 2

The solution of copolymer rubber C and the solution of copolymer rubber G were mixed with each other in amounts of 95 g and 5 g, respectively, in terms of solid content, and desolvation was performed by steam stripping. The rubber was dried with a heated roll of 115° C. to obtain a rubber composition. A compounded rubber prepared according to a compounding formulation shown in Table 4, using this rubber composition, was vulcanized, and subjected to evaluation of physical properties. The results thereof are shown in Table 5.

Comparative Example 3

The solution of copolymer rubber B and the solution of copolymer rubber E were mixed with each other in amounts of 62 g and 38 g, respectively, in terms of solid content, and desolvation was performed by steam stripping. The rubber was dried with a heated roll of 115° C. to obtain a rubber composition. A compounded rubber prepared according to a compounding formulation shown in Table 4, using this rubber composition, was vulcanized, and subjected to evaluation of physical properties. The results thereof are shown in Table 5.

Comparative Example 4

The solution of copolymer rubber A and the solution of copolymer rubber I were mixed with each other in amounts of 90 g and 10 g, respectively, in terms of solid content, and desolvation was performed by steam stripping. The rubber was dried with a heated roll of 115° C. to obtain a rubber composition. A compounded rubber prepared according to a compounding formulation shown in Table 4, using this rubber composition, was vulcanized, and subjected to evaluation of physical properties. The results thereof are shown in Table 5.

Comparative Example 5

The solution of copolymer rubber B and the solution of copolymer rubber H were mixed with each other in amounts of 90 g and 10 g, respectively, in terms of solid content, and desolvation was performed by steam stripping. The rubber was dried with a heated roll of 115° C. to obtain a rubber composition. A compounded rubber prepared according to a compounding formulation shown in Table 4, using this rubber composition, was vulcanized, and subjected to evaluation of physical properties. The results thereof are shown in Table 5.

TABLE 4

| Compounding Component | Parts |
| --- | --- |
| Butadiene Rubber (1) | 30 |
| Rubber Composition or Polymer Rubber (2) | 70 |
| Aromatic Extending Oil (3) | 37.5 |
| Silica (4) | 60 |
| Carbon Black (5) | 15 |
| Silane Coupling Agent (6) | 3 |
| Stearic Acid | 2 |
| Zinc Oxide | 3 |
| Antiaging Agent (7) | 1 |
| Vulcanization Accelerator (8) | 1.0 |
| Vulcanization Accelerator (9) | 1.5 |
| Sulfur | 1.5 |

(Description of Table 4)

(1) BR01 manufactured by JSR Corporation (2) The amount of a polymer rubber excluding an extending oil when oil extended (3) T-DAE manufactured by Fuji Kosan Co., Ltd.

(4) Nipsil AQ manufactured by Nippon Silica Industrial Co., Ltd.

(5) Seast KH manufactured by Tokai Carbon Co., Ltd.

(6) Si69 manufactured by Degussa AG, substance name: bis(3-triethoxysilylpropyl) tetrasulfide (7) Nocrac 810NA manufactured by Ouchishinko Chemical Industrial Co., Ltd., substance name: N-phenyl N'-isopropyl-p-phenylenediamine (8) Nocceler CZ manufactured by Ouchishinko Chemical Industrial Co., Ltd., substance name: N-cyclohexane-2-benzothiazolesulfenamide (9) Nocceler D manufactured by Ouchishinko Chemical Industrial Co., Ltd., substance name: diphenylguanidine

TABLE 5

| | Compounded Rubber Mooney Vis-cosity ($ML_{1+4}$, 100° C.) | μ (index) | 70° C. tan δ (index) | Wear Resistance (index) |
| --- | --- | --- | --- | --- |
| Example 1 | 81 | 128 | 120 | 98 |
| Example 2 | 92 | 115 | 108 | 95 |
| Example 3 | 85 | 125 | 118 | 100 |
| Example 4 | 46 | 110 | 135 | 105 |
| Example 5 | 62 | 139 | 119 | 92 |
| Example 6 | 82 | 125 | 123 | 101 |
| Comparative Example 1 | 50 | 100 | 100 | 100 |
| Comparative Example 2 | 93 | 110 | 100 | 90 |
| Comparative Example 3 | 40 | 123 | 112 | 79 |
| Comparative Example 4 | 61 | 110 | 74 | 65 |
| Comparative Example 5 | 46 | 104 | 103 | 94 |

INDUSTRIAL APPLICABILITY

The rubber composition of the invention is excellent in processability, and is excellent in low hysteresis loss properties and satisfactory in failure strength, and further has low dynamic-to-static modulus ratio and high tan δ, when it is subjected to vulcanization treatment to form a vulcanized rubber. The composition is therefore also useful as a vibration-proof material, as well as a material for a tread of a tire for low fuel consumption, a large sized tire or a high performance tire.

The invention claimed is:

1. A rubber composition mainly comprising
(I) 1 to 10% by weight of a conjugated diene-based (co)polymer rubber represented by the following formula (1) having an amino group and an alkoxysilyl group on a polymer chain and having a weight average molecular weight of 1,000 to 70,000, and
(II) 99 to 90% by weight of a conjugated diene-based (co)polymer rubber having a weight average molecular weight of 100,000 to 2,000,000 (with the proviso that (I)+(II)=100% by weight),

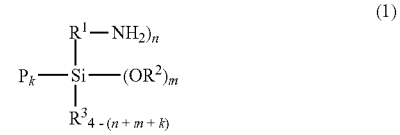

(1)

wherein P is a (co)polymer chain comprising a conjugated diene and an aromatic vinyl compound, $R^1$ is an alkylene group having 1 to 12 carbon atoms, $R^2$ and $R^3$ are each independently an alkyl group having 1 to 20 carbon atoms or an aryl group, n is an integer of 1 or 2, m is an integer of 1 or 2, and k is an integer of 1 or 2, with the proviso that n+m+k is an integer of 3 or 4.

2. The rubber composition according to claim 1, wherein component (II) has at least one selected from the group consisting of an amino group, an alkoxysilyl group, an epoxy group, a hydroxyl group, a tin atom and silicon atom, on a polymer chain.

3. The rubber composition according to claim 1, wherein the composition further contains an extending oil in an amount of 10 to 50 parts by weight based on 100 parts by weight of the total amount of components (I) and (II).

4. The rubber composition according to claim 1, wherein the composition further contains silica and/or carbon black, and the content thereof is from 1 to 150 parts by weight based on 100 parts by weight of the total amount of the rubber components containing components (I) and (II).

* * * * *